US005731514A

United States Patent [19]

Miwa et al.

[11] Patent Number: 5,731,514

[45] Date of Patent: Mar. 24, 1998

[54] ABNORMALITY DETECTING APPARATUS FOR USE IN FUEL-TRANSPIRATION PREVENTING SYSTEMS

[75] Inventors: Makoto Miwa; Shigenori Isomura, both of Kariya; Teruo Nishio, Anjo, all of Japan

[73] Assignee: Denso Corporation, Kariya, Japan

[21] Appl. No.: 759,216

[22] Filed: Dec. 5, 1996

[30] Foreign Application Priority Data

Dec. 5, 1995 [JP] Japan .................................... 7-316316

[51] Int. Cl.$^{6}$ .................................................... G01M 15/00

[52] U.S. Cl. ........................... 73/118.1; 73/49.7; 340/439

[58] Field of Search .................................... 73/116, 117.2, 73/117.3, 118.1, 49.7, 40.5 R

[56] References Cited

U.S. PATENT DOCUMENTS 5,317,909 6/1994 Yamada et al. ......................... 73/118.1
5,408,866 4/1995 Kawamura et al. ..................... 73/49.7
5,463,998 11/1995 Denz et al. ............................ 123/520
5,467,641 11/1995 Williams et al. ........................ 73/49.7
5,560,346 10/1996 Isobe et al. ............................ 123/519

*Primary Examiner*—George M. Dombroske
*Attorney, Agent, or Firm*—Nixon & Vanderhye P.C.

[57] ABSTRACT

An abnormality detecting apparatus for use in a fuel-transpiration preventing mechanism can eliminate effects of changes in operating conditions and variations in equipment to increase the accuracy of abnormality detection. Fuel gas generated in a fuel tank and then absorbed by an absorbing material accommodated in a canister is discharged to an intake pipe by opening and closing a purge control valve. A change in pressure at a negative-pressure holding time after introduction of a negative pressure to the fuel-transpiration preventing mechanism and a change in pressure at an atmosphere-air introduction time after the negative-pressure holding time are calculated and the changes in pressure are used as a basis for determining the existence of an abnormality. As a result, effects of changes in operating conditions and effects of variations in purge control valves and canister closing valves can be eliminated, thus allowing the detection accuracy to be improved.

29 Claims, 6 Drawing Sheets

ABNORMALITY DETECTING APPARATUS FOR USE IN FUEL-TRANSPIRATION PREVENTING SYSTEMS

CROSS-REFERENCE TO RELATED APPLICATION

The present application is related to and claims priority from Japanese Patent Application No. Hei 7-316316, incorporated herein by reference.

BACKGROUND OF THE INVENTION

1. Field of the Invention

The present invention relates to an abnormality detecting apparatus for use in a fuel-transpiration preventing system. The abnormality detecting apparatus is used for detecting an abnormality such as fuel-gas leakage occurring in a fuel-transpiration preventing system for preventing transpiration of fuel gas from occurring in a fuel tank.

2. Description of Related Art

Traditionally, it is necessary to install a fuel-transpiration preventing mechanism in a vehicle or the like for preventing fuel gas generated in the fuel tank thereof from being discharged to the atmosphere. Such a fuel-transpiration preventing mechanism includes a canister installed in a purge passage connecting the fuel tank and an intake pipe of the vehicle's internal combustion engine. The canister has an absorbing material for intermittently absorbing fuel gas. The fuel-transpiration preventing mechanism also includes a purge control valve. By closing and opening the purge control valve in accordance with the operating state of the internal combustion engine, the absorbed fuel gas can be introduced to the intake pipe properly and mixed with air to provide a mixture of fuel gas and air, thus preventing transpiration of the fuel.

In such a fuel-transpiration preventing mechanism, normally, a rubber hose is employed as a purge passage connecting the canister and the intake pipe. If the rubber hose is bent and crushed, some fuel gas is not introduced into the intake pipe. The amount of fuel gas not introduced to the intake pipe may exceed the fuel-gas absorbing power of the absorbing material, causing the fuel gas to be discharged inevitably by way of an atmosphere-exposure hole. It is possible that the rubber hose is damaged by corrosion or other causes due to the fact that the rubber hose is in contact with an alcohol-based substance. In addition, when the pressure inside the rubber hose increases because the atmosphere-exposure hole of the canister is clogged with dust or the like, the rubber hose may fall off. Also in such a case, the fuel gas is discharged to the atmosphere.

Japanese Unexamined Patent Application No. Hei 5-125997 describes an abnormality detecting apparatus for use in a fuel-transpiration preventing mechanism, that is, for detecting the discharging of fuel gas to the atmosphere described above. The document discloses a technique for implementing the detection of an abnormality such as fuel gas leakage in a fuel-transpiration preventing mechanism. The technique includes the steps of closing the atmosphere-exposure hole of a canister by means of a canister closing valve, opening a purge control valve, introducing a negative pressure into the fuel-transpiration preventing mechanism from an intake pipe, closing the purge control valve and monitoring changes in negative pressure starting from the state with the purge control valve closed.

The change in negative pressure is greatly affected by the amount of residual fuel in the fuel-transpiration preventing mechanism, that is, a spatial volume. To be more specific, for a small spatial volume, the change in negative pressure is large even if the amount of leaking fuel gas is small. In the case of a large spatial volume, on the other hand, a small amount of leaking fuel gas cannot be distinguished from a large one. In order to solve this problem, a fuel gauge is installed in a fuel tank and a signal output by the fuel gauge is newly read in to find the amount of residual fuel in the fuel tank. The amount of residual gas is required for correcting a criterion value used in the detection of an abnormality. However, the use of the fuel gauge increases the number of components, giving rise to a problem of increased cost.

A method for solving the problem described above is disclosed in Japanese Unexamined Patent Application No. Hei 6-506751 which, by using a ratio of a change in negative pressure at the introduction of a negative pressure to a change in negative pressure at a negative-pressure hold time, can detect an abnormality such as fuel-gas leakage independently of the spatial volume without the need to install a fuel gauge in the fuel tank.

The change in negative pressure at the introduction of a negative pressure to the fuel-transpiration preventing mechanism is easily affected by changes in intake air pressure and variations in the purge control valve. In addition, division is carried out a number of times during processing, giving rise to a problem that the reliability of the accuracy in the detection of an abnormality is degraded.

SUMMARY OF THE INVENTION

The present invention addresses the above-described problems of the prior art. It an object of the present invention to provide an abnormality detecting apparatus for use in a fuel-transpiration preventing mechanism which can eliminate effects of changes in operating conditions and make processing simple to increase the accuracy of the abnormality detection when detecting an abnormality such as fuel gas leakage occurring in the fuel-transpiration preventing mechanism.

According to an abnormality detecting apparatus for use in a fuel-transpiration preventing system described in the present application, a first pressure-change computing unit computes a change in pressure detected by a pressure detecting unit at a negative-pressure holding time after introduction of a negative pressure to a fuel-transpiration preventing mechanism from an intake pipe according to predetermined control criteria to open and close a purge control valve and an atmosphere-exposure-hole closing unit. A second pressure-change computing unit computes a change in pressure detected by the pressure detecting unit at an atmosphere-air introduction hole for introducing air from the atmosphere by way of the atmosphere-exposure-hole closing unit following the negative-pressure holding time for holding a negative pressure in the fuel-transpiration preventing mechanism according to predetermined control criteria to open and close the purge control valve and the atmosphere-exposure-hole closing unit. Finally, an abnormality detecting unit carries out detection of an abnormality occurring in the fuel-transpiration preventing mechanism based on the changes in pressure calculated by the first and second pressure-change computing units.

As a result, the abnormality detecting apparatus for use in a fuel-transpiration preventing system can eliminate effects of changes in operating conditions and variations of the purge control valve and the atmosphere-exposure-hole closing unit to increase the accuracy of the abnormality detection when detecting an abnormality such as fuel gas leakage occurring in the fuel-transpiration preventing mechanism.

Preferably, the abnormality detecting unit uses pressure slopes based on the changes in pressure computed by the first and second pressure-change computing units in processing to detect an abnormality occurring in the fuel-transpiration preventing mechanism. As a result, effects of changes in spatial volume can be eliminated, increasing the accuracy of detection of an abnormality occurring in the fuel-transpiration preventing mechanism.

Also, it is preferable that the second pressure-change computing unit computes a change in pressure at the atmosphere-air introducing time for introducing air by way of the atmosphere-exposure-hole closing unit after a negative pressure has been re-introduced in the case of a large change in pressure at the negative-pressure holding time occurring in the fuel-transpiration preventing mechanism according to predetermined control criteria to open and close the purge control valve and the atmosphere-exposure-hole closing unit. As a result, an initial negative pressure at the time air is introduced from the atmosphere after the negative-pressure holding time is large in magnitude and changes in pressure at that time are stabilized, increasing the accuracy of detection of an abnormality occurring in the fuel-transpiration preventing mechanism.

It is preferable that the atmosphere-exposure-hole closing unit is driven by a driving signal with a duty ratio set in accordance with a negative pressure prior to introduction of air from the atmosphere. As a result, a change in pressure at the atmosphere-air introducing time can be computed with a high degree of accuracy even if a residual negative pressure at the negative-pressure holding time all but vanishes, increasing the accuracy of detection of an abnormality occurring in the fuel-transpiration preventing mechanism.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The present invention will become apparent from the following detailed description of some preferred embodiments with reference to accompanying diagrams showing the embodiments.

First Embodiment

Figure 1:
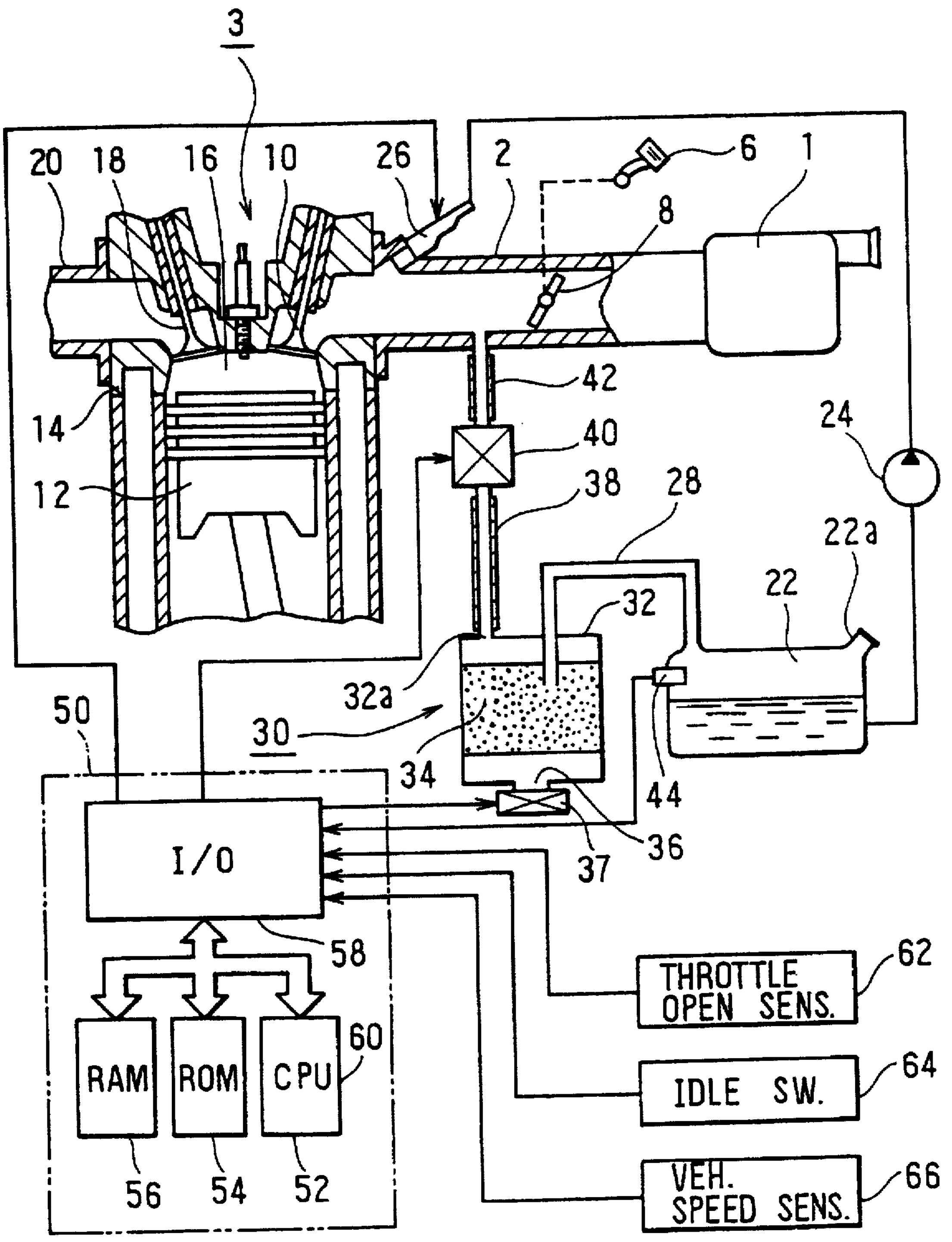
FIG. 1 is a schematic diagram of an abnormality detecting apparatus for use in a fuel-transpiration preventing mechanism according to a first embodiment of the present invention.

FIG. 1 is a diagram of an abnormality detecting apparatus for use in a fuel-transpiration preventing mechanism according to a first embodiment of the present invention.

In the abnormality detecting apparatus shown in FIG. 1, air taken in by way of an air cleaner 1 for filtering the air is supplied to an intake pipe 2 connected to the air cleaner 1. A throttle valve 8 provided in the intake pipe 2 is closed and opened responsive to the position of an accelerator pedal 6. The intake pipe 2 is connected to a combustion chamber 16 including a piston 12 and a cylinder head 14 of an internal combustion engine 3 by way of an intake valve 10. In addition, the combustion chamber 16 is connected to an exhaust pipe 20 by way of an exhaust valve 18.

A fuel pump 24 for supplying fuel by pressurizing the liquid fuel contained in a fuel tank 22 is connected to a fuel injector 26 installed on the intake pipe 2 so that the fuel can be injected by controlling an operation to open and close the injector 26. In addition, a connection pipe 28 is used for connecting the fuel tank 22 to a canister 30. In a canister body 32, absorbing material 34 for absorbing fuel gas is accommodated. Activated carbon is typically used as the absorbing material. With such a structure, the canister 30 can absorb fuel gas generated by the fuel tank 22 by way of the connection pipe 28. In addition, an atmosphere-exposure hole 36 for introducing air from the atmosphere is bored through the wall of the canister body 32 to allow air to be introduced from the atmosphere into the inside of the canister body 32. A canister closing valve (an atmosphere-exposure-hole closing valve) 37 is provided in the atmosphere-exposure hole 36 for closing the atmosphere-exposure hole 36 if necessary.

The canister closing valve 37 is an electromagnetic valve. With a predetermined voltage applied to the canister closing valve 37, the canister closing valve 37 closes the atmosphere-exposure hole 36 of the canister body 32. When the predetermined voltage is removed, however, air is introduced into the canister body 32 by way of the atmosphere-exposure hole 36.

One end of a supply pipe 38 is inserted into a hose connector 32*a* of the canister body 32 and connected to the canister 30. The other end of the supply pipe 38 is connected to a purge control valve 40. One end of another supply pipe 42 is connected to the purge control valve 40 whereas the other end of the supply pipe 42 is connected to the intake pipe 2. Both the supply pipes 38 and 42 are rubber or nylon hoses which together form a flexible pipe. Part of the connection pipe 28 connecting the fuel tank 22 to the canister 30 is also a rubber hose or the like.

The supply pipes 38 and 42 connected to the purge control valve 40 and the connection pipe 28 form a purge passage from the fuel tank 22 to the intake pipe 2. It should be noted that the purge control valve 40 provided between the supply pipes 38 and 42 is used as a switch for opening and closing the purge passage between the intake pipe 2 and the canister 30. To be more specific, the purge control valve 40 connects or disconnects the supply pipes 38 and 42 in accordance with an input signal supplied thereto.

The purge control valve 40 is an electromagnetic valve which is put in a purge state by a predetermined pulse signal applied thereto for opening the passage between the canister 30 connected to the supply pipe 38 and the intake pipe 2 connected to the supply pipe 42. It should be noted that the duty ratio of the pulse signal, that is, the ratio of the pulse width to the period of the pulse signal, can be changed continuously in order to control the purge flow of fuel gas from the canister 30 to the intake pipe 2.

A pressure sensor 44 installed in the fuel tank 22 is used for detecting a fuel tank 22 internal pressure PTNK, that is, the pressure of fuel in the fuel tank 22. The fuel tank also has a relief valve 22*a* for releasing the fuel tank 22 from the fuel tank internal pressure PTNK should it go out of the range–40 mmHg to 150 mmHg. As a result, variations in fuel-gas pressure in the segment between the fuel tank 22 and the canister 30 can be suppressed to always fall within this relief-pressure range. For this reason, a pressure sensor 44 with a characteristic withstanding pressure within this relief pressure range will be able to achieve its purpose adequately.

The injector 26, the canister closing valve 37, the purge control valve 40 and the pressure sensor 44 are connected to an ECU (Electronic Control Unit) 50. The ECU 50 is a logical processing circuit which includes a CPU 52 serving as a central processing unit, a ROM unit 54 for storing a control program, maps and other fixed data, a RAM unit 56 for storing various kinds of data, an input/output circuit 58 and a common bus 60 for connecting the CPU 52, the ROM unit 54, the RAM unit 56 and the input/output circuit 58 to each other. Connected to the input/output circuit 58 are, among other components, a throttle opening sensor 62, an idle switch 64 and a vehicle-speed sensor 66. Executing the control program stored in the ROM unit 54, the CPU 52 employed in the ECU 50 outputs driving signals to the injector 26, the canister closing valve 37, the purge control valve 40 and other components by way of the input/output circuit 58 in accordance with signals received from the sensors by way of the input/output circuit 58 and data stored in the RAM unit 56. In this way, the ECU 50 implements the control of the fuel injection, the canister purge, the abnormality detection in the fuel-transpiration preventing mechanism and other kinds of control.

Figure 2:
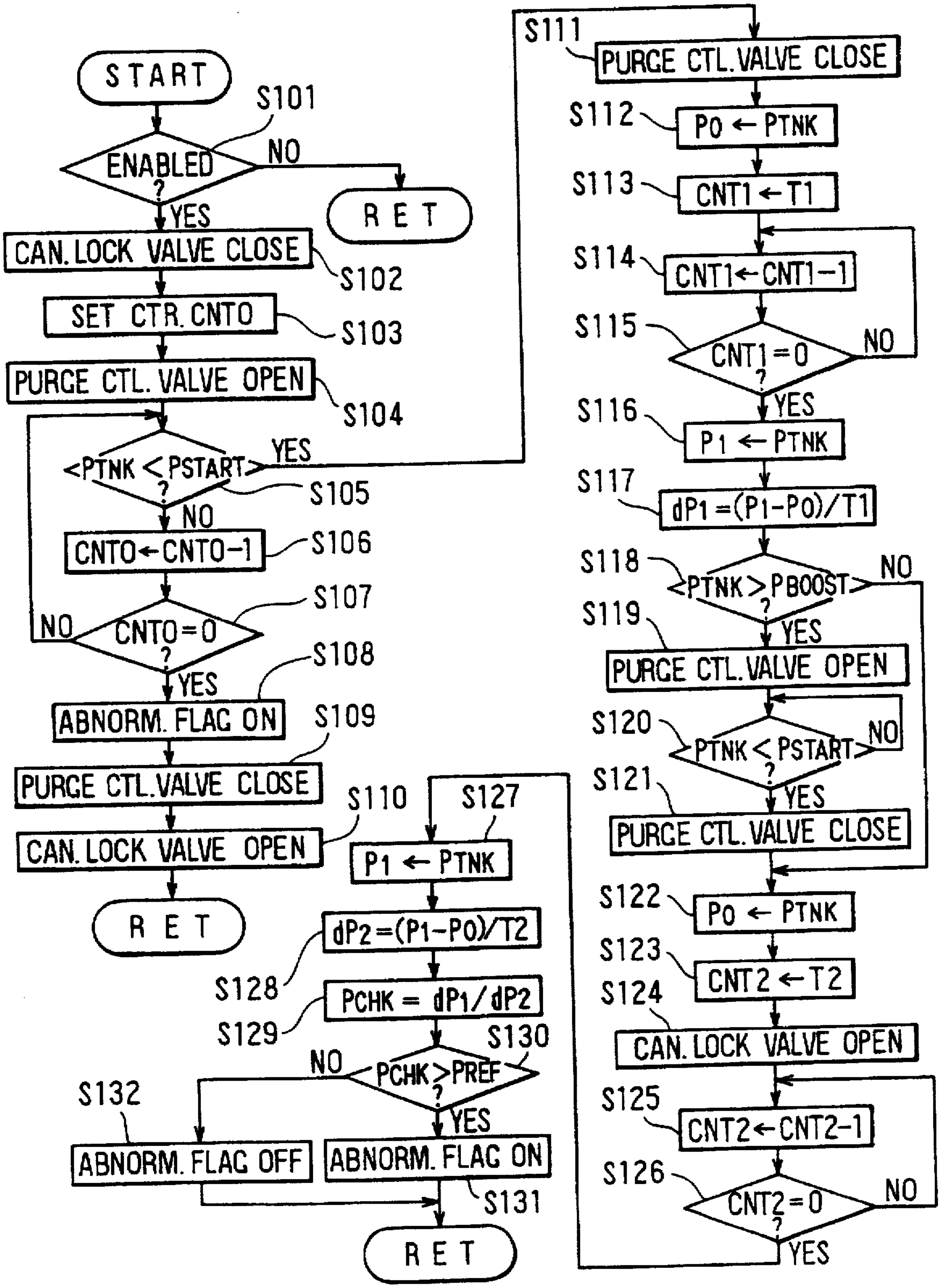
FIG. 2 is a flowchart showing a procedure of processing for detecting an abnormality carried out by a CPU of an ECU employed in the abnormality detecting apparatus for use in the fuel-transpiration preventing mechanism according to the first embodiment.
Figures 3A, 3B, 3C:
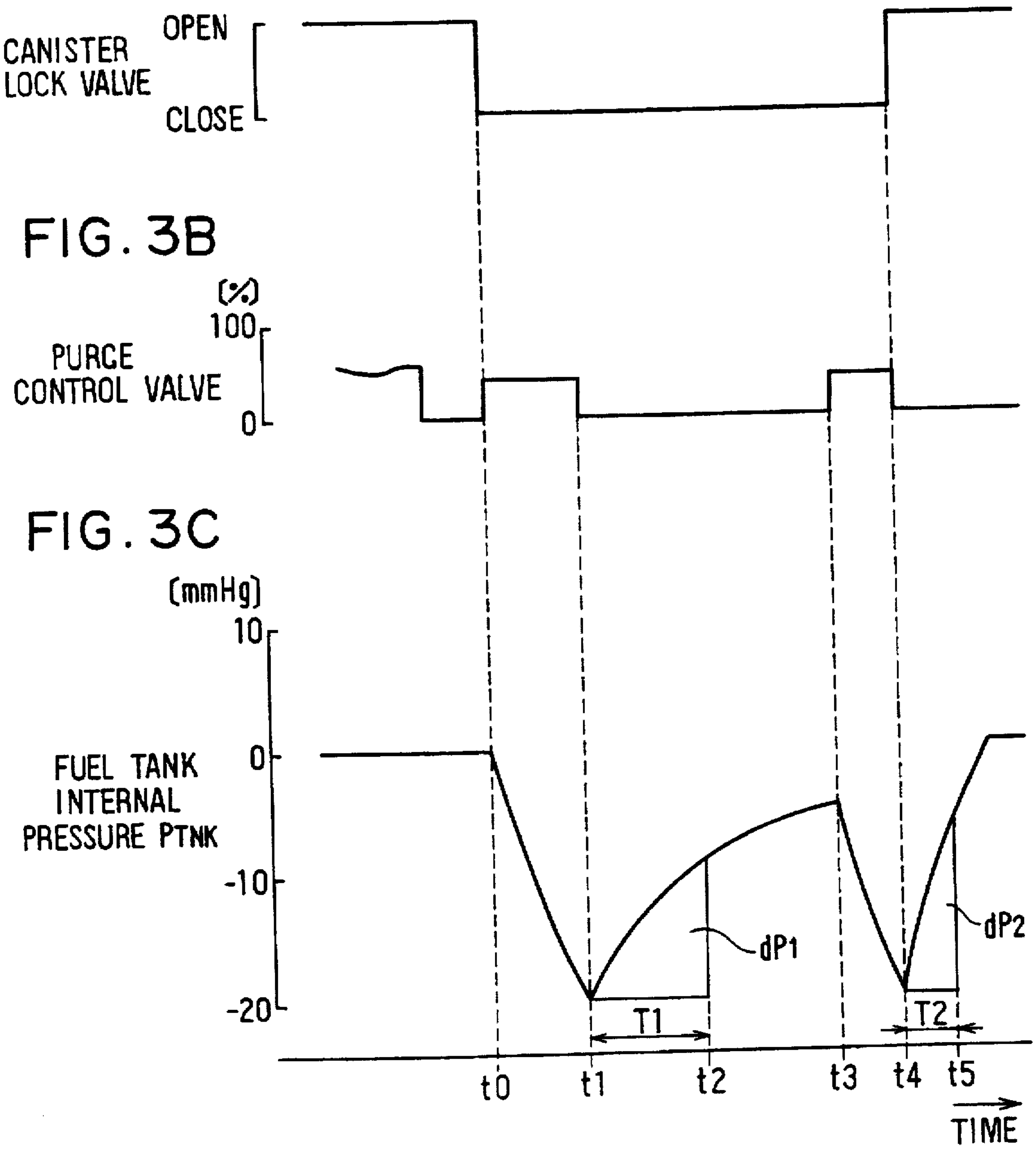
FIGS. 3A–3C are graphs showing aspects of the flowchart shown in FIG. 2.

Next, processing for detecting an abnormality carried out by the CPU 52 of the ECU 50 employed in the abnormality detecting apparatus for use in a fuel-transpiration preventing mechanism according to the first embodiment of the present invention is explained by referring to a flowchart shown in FIG. 2 as well as graphs shown in FIGS. 3A–3C.

First of all, the processing flow begins with Step S101 to make a judgment as to whether or not conditions for executing detection of an abnormality in the present system, that is, in the fuel-transpiration preventing mechanism, hold true. The execution conditions typically include a halted or idle state with no judgment and other system affecting states except a failure-diagnosis state. If the execution conditions are found not to be true at Step S101, the present routine is terminated. If the execution conditions are found to be true at Step S101, on the other hand, the processing flow goes on to Step S102 where the canister closing valve 37 is put in a closing state. The processing flow then proceeds to Step S103 where a time duration of typically 10 seconds required for introducing a negative pressure is set in a count variable CNT0.

The processing flow then continues to Step S104 where the purge control valve 40 is opened at a predetermined duty ratio to start the introduction of the negative pressure of the intake pipe 2 to the present system at a time t0 shown in FIGS. 3A–3C. The processing flow then goes on to Step S105 to make a judgment as to whether or not the fuel tank internal pressure PTNK has reached a value smaller than a predetermined pressure PSTART. By setting the predetermined pressure PSTART at as large a negative value as possible, the accuracy of the detection of fuel-gas leakage can be increased further. In the case of a large negative value of the predetermined pressure PSTART, however, it is necessary to take the withstand pressures of components composing the fuel-transpiration preventing mechanism, in particular, the fuel tank into consideration. In general, the predetermined pressure PSTART is set at −20 mmHg.

If the judgment made at Step S105 determines that the condition is not satisfied, that is, if the fuel tank internal pressure PTNK has not reached the predetermined pressure PSTART, the processing flow goes on to Step S106 where the count variable CNT0 is decremented by one. The processing flow then proceeds to Step S107 to make a judgment as to whether the count variable CNT0 has become equal to zero. If the judgment made at Step S107 determines that the condition is not satisfied, that is, if the count variable CNT0 is not zero at Step S107, the processings at Steps S105 to S107 are repeated till the count variable CNT0 is zero at Step S107. If the fuel tank internal pressure PTNK has not reached the predetermined pressure PSTART even after the predetermined time duration has lapsed, that is, even if the count variable CNT0 is zero at Step S107, relatively large fuel-gas leakage is determined to have occurred due to failures such as a pipe getting out of place and a filler cap unintentionally left unclosed. In this case, the processing flow goes on to Step S108 where an abnormality flag is set (or turned on). The processing flow then continues to Step S109 where the purge control valve 40 is closed. The processing flow then goes on to Step S110 where the canister closing valve 37 is opened, the original state thereof, before the present routine is completed.

If the judgment made at Step S105 determines that the condition is satisfied, that is, if the fuel tank internal pressure PTNK has reached the predetermined pressure PSTART normally before the predetermined time duration has lapsed as evidenced by the count variable CNT0 found to be equal to zero at Step S107, on the other hand, the processing flow goes on to Step S111 where the purge control valve 40 is closed at a time t1 shown in FIGS. 3A–3C. The processing flow then proceeds to Step S112 where the fuel tank internal pressure PTNK read at that time is stored as an initial value P0. The processing flow then continues to Step S113 where a time-counter variable CNT1 for time measurement is set at an initial value T1 which is typically 10 seconds. The initial value T1 is used for calculating the pressure slope of the change in pressure obtained with the fuel-transpiration preventing mechanism closed to hold the negative pressure.

The processing flow then continues to Step S114 where the timer-counter variable CNT1 is decremented by one. The processing flow then goes on to Step S115 to make a judgment as to whether or not the timer-counter variable CNT1 is equal to zero. If the judgment made at Step S115 determines that the condition is not satisfied, that is, if the timer-counter variable CNT1 is not equal to zero, the processings carried out at Steps S114 and S115 are repeated until the timer-counter variable CNT1 is zero at Step S115, that is, until the time of the initial value T1 lapses. In this case, the processing flow goes on to Step S116 where the fuel tank internal pressure PTNK read in at that time (or at a time t2 shown in FIGS. 3A–3C) is stored as P1. Then, the processing flow goes on to Step S117 where the pressure slope dP1 of the change in pressure obtained with the fuel-transpiration preventing mechanism closed to hold the negative pressure is calculated by using Equation (1):

$$dP1 = \frac{P1 - P0}{T1} \quad (1)$$

The processing flow then proceeds to Step S118 to make a judgment as to whether or not the fuel tank internal pressure PTNK read in at that time exceeds a negative pressure PBOOST. The negative pressure PBOOST is a fuel tank internal pressure PTNK with a value sufficiently large enough for detecting a pressure slope from the time to hold the negative pressure to the time to introduce air of the atmosphere by way of the canister closing valve 37. The negative pressure PBOOST has a typical value of −10 mmHg. If the judgment made at Step S118 determines that the condition is satisfied, that is, if the fuel tank internal pressure PTNK read in at that time exceeds the negative pressure PBOOST, the processing flow goes on to Step S119 where the purge control valve 40 is opened at a time t3 shown in FIGS. 3A–3C in order to introduce the negative pressure again. The processing flow then goes on to Step S120 to make a judgment as to whether or not the fuel tank internal pressure PTNK has reached a value smaller than a predetermined pressure PSTART.

Much like the predetermined pressure PSTART used at Step S105, by setting the predetermined pressure PSTART used at Step S120 at as large a negative value as possible, the accuracy of the detection of fuel-gas leakage can be increased further. In the case of a large negative value of the predetermined pressure PSTART, however, it is necessary to take the withstand pressures of components composing the fuel-transpiration preventing mechanism, in particular, the fuel tank, into consideration. In general, the predetermined pressure PSTART is set at −20 mmHg. It should be noted that the processing to introduce a negative pressure at Step S119 is basically the same as the first processing to introduce a negative value carried out at Step S104. In the present embodiment, however, a judgment as to whether or not the negative pressure can be introduced to reach a predetermined value in a predetermined period of time is omitted. Such verification has been completed in the first introduction of a negative pressure so that it is deemed unnecessary to repeat the verification in the second introduction. Nonetheless, the time it takes to introduce a negative pressure can be monitored for thoroughness.

If the judgment made at Step S120 determines that the condition is satisfied, that is, if the fuel tank internal pressure PTNK has reached the predetermined pressure PSTART, the processing flow goes on to Step S121 where the purge control valve 40 is closed before continuing to Step S122. If the judgment made at Step S118 determines that the condition is not satisfied, that is, if the fuel tank internal pressure PTNK read in at that time is equal to or smaller than the negative pressure PBOOST, on the other hand, the processing flow then continues to Step S122, skipping Steps S119 to S121. At Step S122, the fuel tank internal pressure PTNK read at that time (that is, at a time t4 shown in FIGS. 3A–3C) is stored as the initial value P0. The processing flow then goes on to Step S123 where a timer-counter variable CNT2 is set to an initial value T2.

The processing flow then goes on to Step S124 where the canister closing valve 37 is opened, allowing air to be introduced from the atmosphere. The processing flow then continues to Step S125 where the timer-counter variable CNT2 is decremented by one. The processing flow then goes on to Step S126 to make a judgment as to whether or not the timer-counter variable CNT2 has become equal to zero. If the judgment made at Step S126 determines that the condition is not satisfied, that is, if the timer-counter variable CNT2 is not zero, the processings carried out at Steps S125 and S126 are repeated till the timer-counter variable CNT2 is zero at Step S126, that is, till the time of the initial value T2 lapses. In this case, the processing flow goes on to Step S127 where the fuel tank internal pressure PTNK read in at that time (or at a time t5 shown in FIGS. 3A–3C) is stored as P1. Then, the processing flow goes on to Step S128 where a pressure slope dP2 of the change in pressure occurring in the fuel-transpiration preventing mechanism from the predetermined pressure PSTART to the pressure generated at the time the air is introduced from the atmosphere is calculated by using Equation (2):

$$dP2 = \frac{P1 - P0}{T2} \quad (2)$$

The processing flow then goes on to Step S129 where a ratio PCHK of the pressure slope dP1 computed at Step S117 with the negative pressure held to the pressure slope dP2 computed at Step S128 with air introduced from the atmosphere is calculated by using Equation (3):

$$PCHK = \frac{dP1}{dP2} \quad (3)$$

The processing flow then proceeds to Step S130 to make a judgment as to whether or not the pressure-gradient ratio PCHK computed at Step S129 exceeds a criterion value PREF used for detecting an abnormality such as fuel-gas leakage. If the judgment made at Step S130 determines that the condition is satisfied, that is, if the pressure-gradient ratio PCHK is greater than the criterion value PREF, the processing flow goes on to Step S131 where an abnormality flag is turned on (or set) to indicate that the existence of an abnormality such as fuel-gas leakage has been determined before terminating the present routine. If the judgment made at Step S130 determines that the condition is not satisfied, that is, if the pressure-gradient ratio PCHK is less than or equal to the criterion value PREF, on the other hand, the processing flow goes on to Step S132 where an abnormality flag is turned off (or cleared) to indicate that no abnormality such as fuel-gas leakage has been determined, completing the present routine.

It should be noted that the denominator and the numerator used in the calculation of the pressure-slope ratio PCHK carried out at Step S129 of the routine described above can be swapped with each other to give the reciprocal of the pressure-slope ratio PCHK. In this case, however, the criterion value PREF and the sign of inequality used at Step S130 of course need to be modified.

Figure 4:
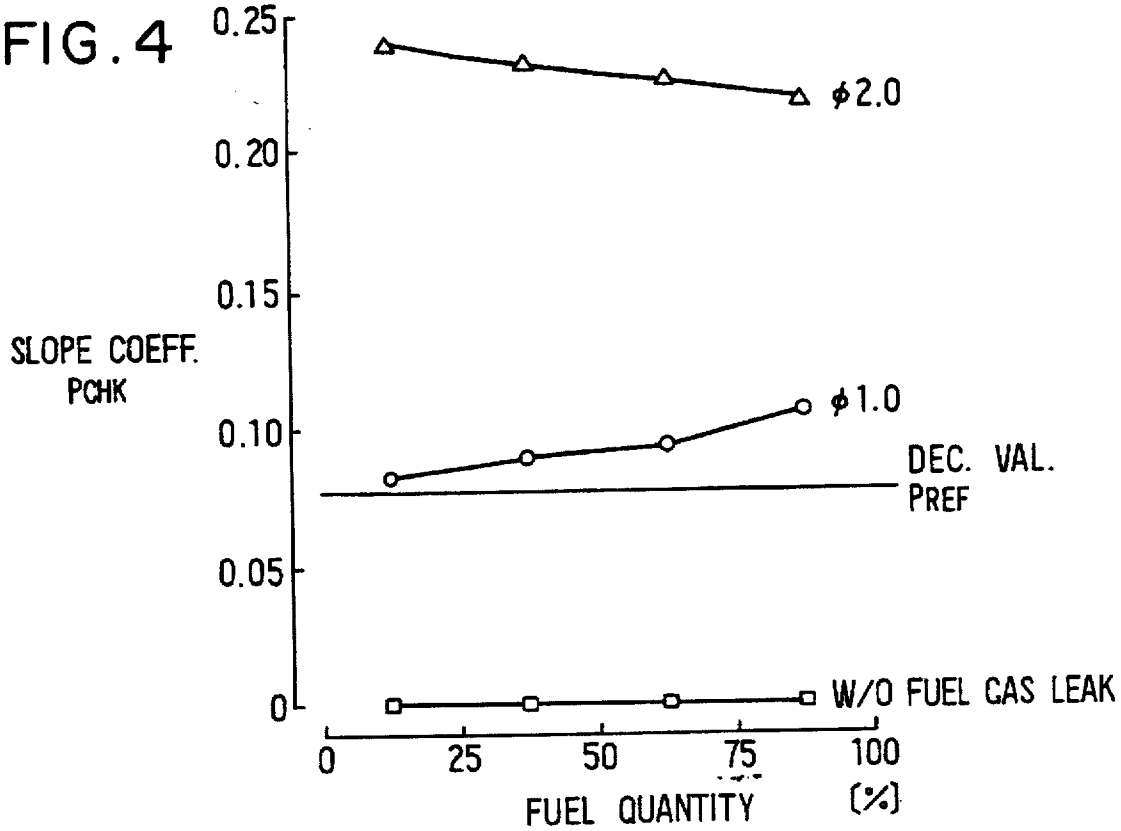
FIG. 4 is a graph showing relationships between a pressure-slope ratio and a criterion value adopted in the abnormality detecting apparatus according to the first embodiment with the amount of fuel used as a parameter.

FIG. 4 is a graph showing a relationship between the pressure-slope ratio PCHK and the criterion value PREF adopted in the abnormality detecting apparatus according to the first embodiment with the amount of fuel (expressed in terms of percents) in the fuel tank 22 used as a parameter.

As shown in the Figure, when there is no fuel-gas leakage in the fuel-transpiration preventing mechanism, the pressure-slope ratio PCHK has a value of zero. As the leakage diameter increases from ø 1.0 to ø 2.0, the pressure-slope ratio also increases but is all but independent of the amount of fuel, that is, has a value which hardly depends on the amount of fuel. For this reason, in order to detect a fuel-gas leakage of greater than the leakage diameters ø 0.1 and ø 0.2, it is necessary to set the criterion value PREF at a value slightly smaller than the pressure-slope ratio PCHK for a leakage diameter of ø 1.0 as is obvious from the relation shown in the Figure. The criterion value slightly smaller than the pressure-slope ratio PCHK for a leakage diameter of ø 1.0 is used because it is necessary to take the effects of variations and the like into consideration.

The abnormality detecting apparatus for use in a fuel-transpiration preventing mechanism can eliminate effects of changes in operating condition and variations of the purge control valve 40 and the canister closing valve 37 to increase the accuracy of the abnormality detection when detecting an abnormality such as fuel gas leakage occurring in the fuel-transpiration preventing mechanism.

In the abnormality detecting apparatus for use in a fuel-transpiration preventing mechanism according to this embodiment, the abnormality detecting unit implemented by the CPU 52 employed in the ECU 50 carries out processing for detecting an abnormality occurring in the fuel-transpiration preventing mechanism by using a pressure-slope ratio PCHK, a ratio of dP1 to dP2 where dP1 is a pressure slope at the negative-pressure holding time representing a change in pressure computed by the CPU 52 employed in the ECU serving as the first pressure-change computing unit and dP2 is a pressure slope at the atmosphere-air introducing time representing a change in pressure computed by the CPU 52 employed in the ECU serving as the second pressure-change computing unit. In this way, since the CPU 52 employed in the ECU 50 uses a pressure-slope ratio in the processing, effects of the size of the spatial volume are eliminated, thereby allowing the accuracy of detection of an abnormality occurring in the fuel-transpiration preventing mechanism to be improved.

In the abnormality detecting apparatus for use in a fuel-transpiration preventing mechanism according to this embodiment, the second pressure-change computing unit implemented by the CPU 52 employed in the ECU 50 computes the pressure slope dP2 at the atmosphere-air introducing time representing a change in pressure at the time air is introduced from the atmosphere by way of the atmosphere-exposure-hole closing unit 37 after a negative pressure has been re-introduced in the case of a large change in pressure at the time the negative pressure is held in the fuel-transpiration preventing mechanism according to predetermined control criteria to open and close the purge control valve 40 and the atmosphere-exposure-hole closing unit 37. As a result, the initial negative pressure at the time air is introduced following the holding of a negative pressure increases, so that the pressure slope dP2 at the atmosphere-air introducing time can be computed in a stable condition, allowing the accuracy of the detection of an abnormality occurring in the fuel-transpiration preventing mechanism to be increased.

Second Embodiment

Figure 7:
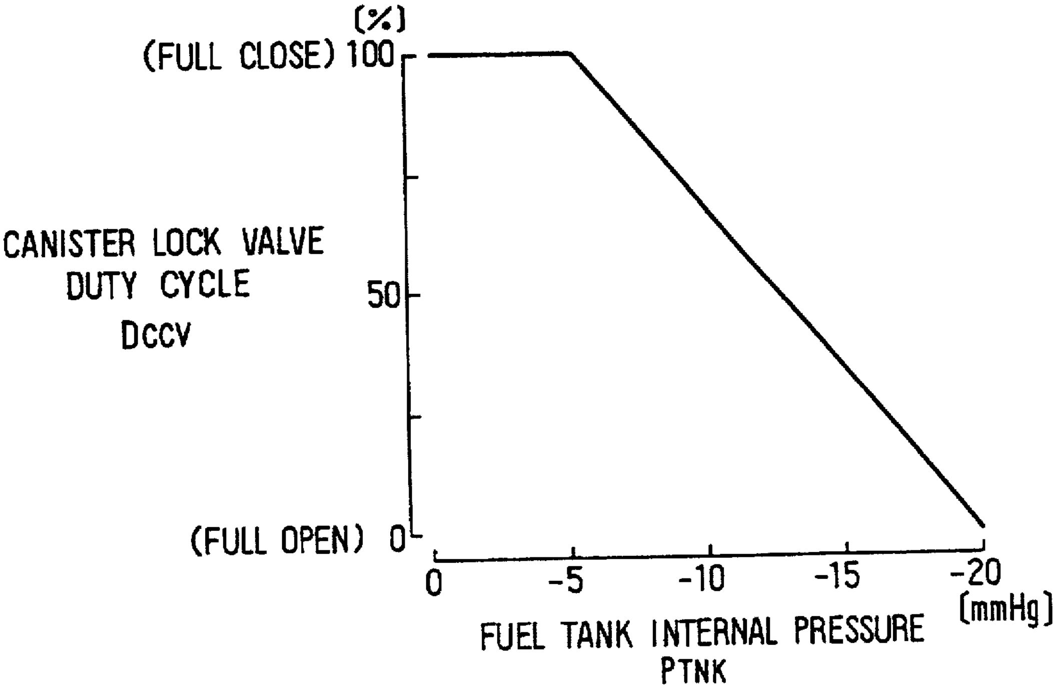
FIG. 7 is a graph showing a relationship between the duty cycle of a canister closing valve (an atmosphere-exposure-hole closing valve) and a fuel tank internal pressure used in the flowchart of the abnormality detecting routine shown in FIG. 5.
Figure 5:
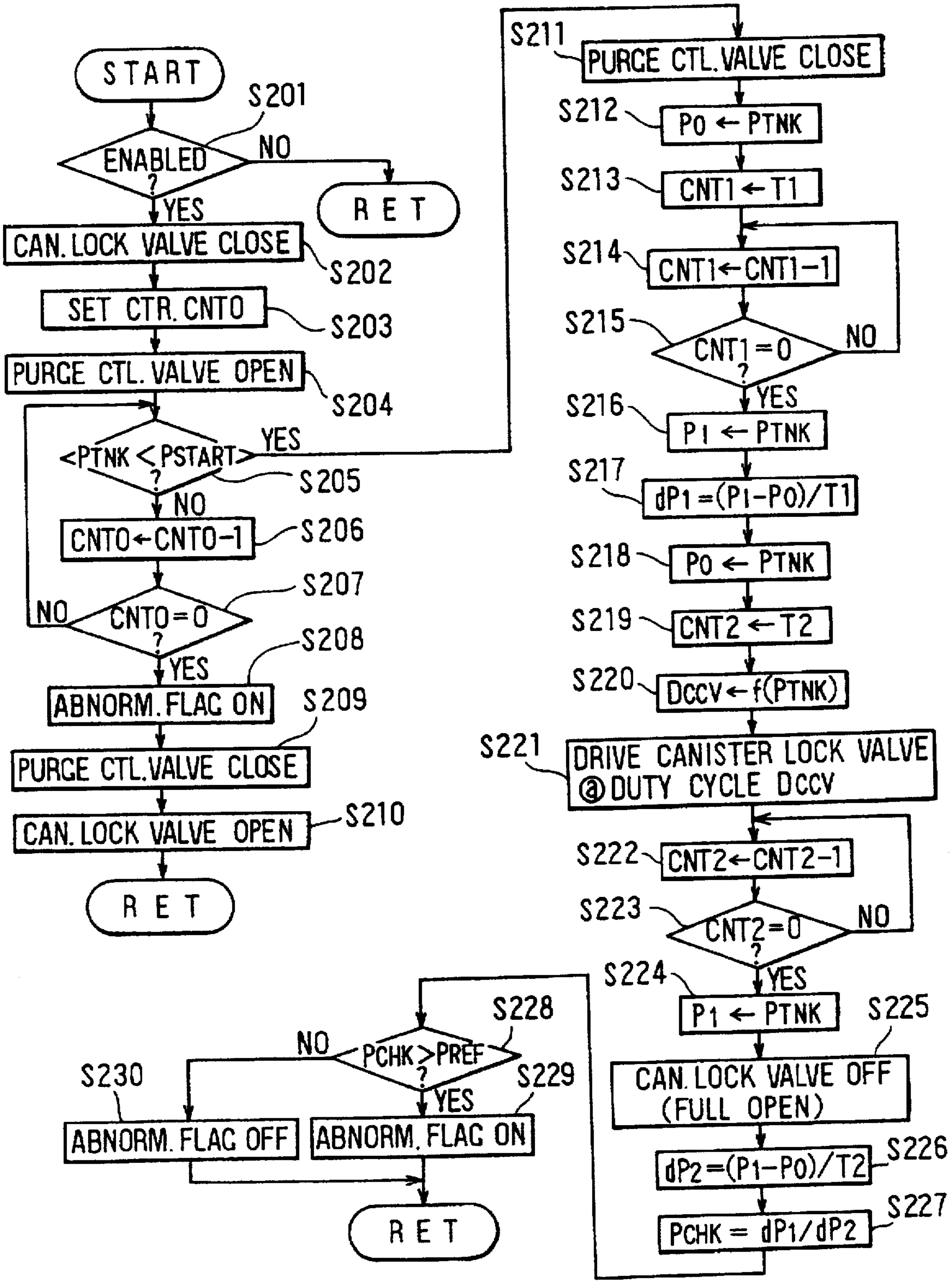
FIG. 5 is a flowchart showing a procedure of processing for detecting an abnormality carried out by a CPU of an ECU employed in the abnormality detecting apparatus according to a second embodiment of the present invention.
Figures 6A, 6B, 6C:
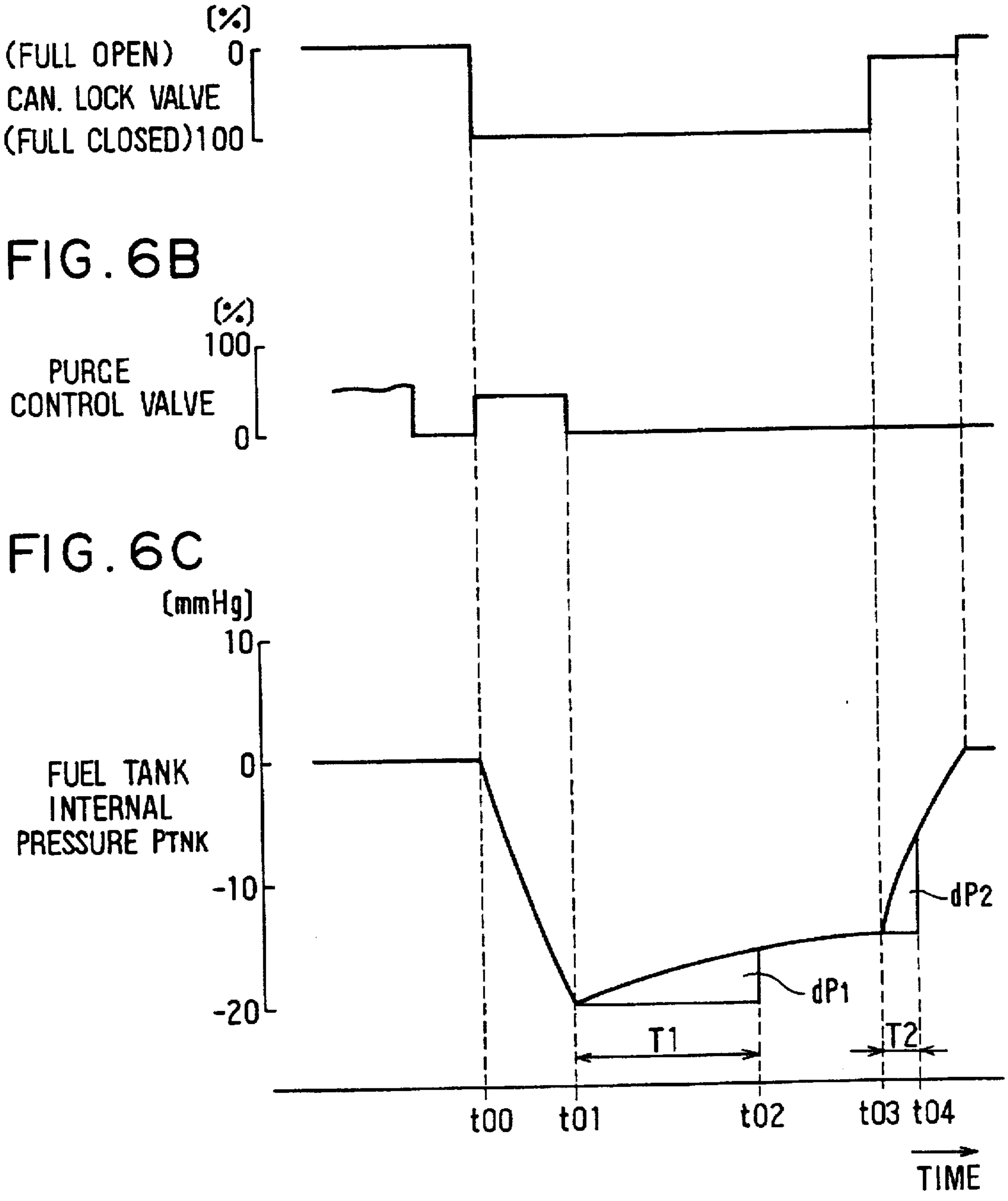
FIGS. 6A–6C are graphs showing aspects of the flowchart shown in FIG. 5.

FIG. 5 is a flowchart showing the processing procedure for detection of an abnormality carried out by the CPU 52 of the ECU 50 employed in an abnormality detecting apparatus for use in a fuel-transpiration preventing mechanism according to a second embodiment of the present invention. FIGS. 6A–6C are graphs which are referred to when explaining the flowchart shown in FIG. 5. FIG. 7 is a graph showing a curve of a relationship between the duty cycle DCCV of the canister closing valve 37 and the fuel tank internal pressure PTNK used in the flowchart shown in FIG. 5. It should be noted that the configuration of the abnormality detecting apparatus for use in a fuel-transpiration preventing mechanism as implemented by the second embodiment is the same as the first embodiment shown in the skeleton diagram of FIG. 1 except for the canister closing valve 37. For this reason, detailed explanation of the configuration of the second embodiment is omitted.

The canister closing valve 37 employed in the second embodiment is an electromagnetic valve which is used for closing the atmosphere-exposure hole 36 on the canister body 32 in the closed direction from an open direction when a predetermined pulse signal is applied to the canister closing valve 37. By changing the duty ratio DCCV of the pulse signal, that is, the ratio of the pulse width to the period of the pulse signal continuously, the amount of a flow of atmosphere air introduced to the canister 30 by way of the atmosphere-exposure hole 36 can be controlled.

Next, the operations of the second embodiment are explained by referring to the abnormality detecting routine shown in FIG. 5, the graphs in FIGS. 6A–6C and the graph of FIG. 7.

First of all, the processing flow begins with Step S201 to make a judgment as to whether or not conditions for executing detection of an abnormality in the present system, that is, in the fuel-transpiration preventing mechanism, hold true. The execution conditions include typically a halted or idle state with no judgment and other system affecting states except a failure-diagnosis state. If the execution conditions are found not to be true at Step S201, the present routine is terminated. If the execution conditions are found to be true at Step S201, on the other hand, the processing flow goes on to Step S202 where the canister closing valve 37 is closed. The processing flow then proceeds to Step S203 where a time duration of typically 10 seconds required for introducing a negative pressure is set in a count variable CNT0.

The processing flow then continues to Step S204 where the purge control valve 40 is opened at a predetermined duty ratio to start the introduction of the negative pressure of the intake pipe 2 to the present system at a time t00 shown in FIGS. 6A–6C. The processing flow then goes on to Step S205 to make a judgment as to whether or not the fuel tank internal pressure PTNK has reached a value smaller than a predetermined pressure PSTART. By setting the predetermined pressure PSTART at as large a negative value as possible, the accuracy of the detection of fuel-gas leakage can be increased further. In the case of a large negative value of the predetermined pressure PSTART, however, it is necessary to take the withstand pressures of components composing the fuel-transpiration preventing mechanism, in particular, the fuel tank 22 into consideration. In general, the predetermined pressure PSTART is set at −20 mmHg.

If the judgment made at Step S205 determines that the condition is not satisfied, that is, if the fuel tank internal pressure PTNK has not reached the predetermined pressure PSTART, the processing flow goes on to Step S206 where the count variable CNT0 set at Step S203 is decremented by one. The processing flow then proceeds to Step S207 to make a judgment as to whether the count variable CNT0 is equal to zero. If the judgment made at Step S207 determines that the condition is not satisfied, that is, if the count variable CNT0 is not equal to zero at Step S207, the processings at Steps S205 to S207 are repeated till the count variable CNT0 is zero at Step S207. If the fuel tank internal pressure PTNK has not reached the predetermined pressure PSTART even after the predetermined time duration has lapsed, that is, even if the count variable CNT0 is zero at Step S207, relatively large fuel-gas leakage is determined to have occurred due to failures such as a pipe getting out of place and a filler cap unintentionally left unclosed. In this case, the processing flow goes on to Step S208 where an abnormality flag is set (or turned on). The processing flow then continues to Step S209 where the purge control valve 40 is closed. The processing flow then goes on to Step S210 where the canister closing valve 37 is opened, the original state thereof, before the present routine is completed.

If the judgment made at Step S205 determines that the condition is satisfied, that is, if the fuel tank internal pressure PTNK has reached the predetermined pressure PSTART normally before the predetermined time duration has lapsed as shown by the count variable CNT0 found to be equal to zero at Step S207, on the other hand, the processing flow goes on to Step S211 where the purge control valve 40 is closed at a time t01 shown in FIGS. 6A–6C. The processing flow then proceeds to Step S212 where the fuel tank internal pressure PTNK read at that time is stored as an initial value P0. The processing flow then continues to Step S213 where a time-counter variable CNT1 for time measurement is set at an initial value T1 which is typically 10 seconds. The initial value T1 is used for calculating the pressure slope of the change in pressure obtained with the fuel-transpiration preventing mechanism closed to hold the negative pressure.

The processing flow then continues to Step S214 where the timer-counter variable CNT1 is decremented by one. The processing flow then goes on to Step S215 to make a judgment as to whether or not the timer-counter variable CNT1 is equal to zero. If the judgment made at Step S215 determines that the condition is not satisfied, that is, if the timer-counter variable CNT1 is not equal to zero, the processings carried out at Steps S214 and S215 are repeated till the timer-counter variable CNT1 is zero at Step S215, that is, till the time of the initial value T1 lapses. In this case, the processing flow goes on to Step S216 where the fuel tank internal pressure PTNK read in at that time (or at a time t02 shown in FIGS. 6A–6C) is stored as P1. Then, the processing flow goes on to Step S217 where the pressure slope dP1 of the change in pressure obtained with the fuel-transpiration preventing mechanism closed to hold the negative pressure is calculated by using Equation (1) above.

The processing flow then goes on to Step S218 where the fuel tank internal pressure PTNK read at that time (that is, at a time t03 shown in FIGS. 6A–6C) is stored as the initial value P0. The processing flow then goes on to Step S219 where a timer-counter variable CNT2 is set to an initial value T2. The processing flow then goes on to Step S220 where the duty cycle DCCV of the canister closing valve 37 corresponding to the fuel tank internal pressure P1 stored at Step S216 is calculated from the graph shown in FIG. 7. The processing flow then continues to Step S221 where the canister closing valve 37 is driven at the canister-closing-valve duty cycle DCCV calculated at Step S220. The processing flow then goes on to Step S222 where the timer-counter variable CNT2 is decremented by one. The processing flow then goes on to Step S223 to make a judgment as to whether or not the timer-counter variable CNT2 is equal to zero.

If the judgment made at Step S223 determines that the condition is not satisfied, that is, if the timer-counter variable CNT2 is not equal to zero, the processings carried out at Steps S222 and S223 are repeated till the timer-counter variable CNT2 is zero at Step S223, that is, till the time of the initial value T2 lapses. In this case, the processing flow goes on to Step S224 where the fuel tank internal pressure PTNK read in at that time (or at a time t04 shown in FIGS. 6A–6C) is stored as P1. The processing flow then proceeds to Step S225 where the canister closing valve 37 is put in an OFF (completely open) state. The processing flow then goes on to Step S226 to calculate a pressure slope dP2 at an atmosphere-air introducing time, that is, at the time air is introduced with the canister closing valve 37 driven at the canister-closing valve duty ratio DCCV calculated at Step S220 to result in a drop in fuel tank internal pressure PTNK from P1 to P0 in the fuel-transpiration preventing mechanism, using Equation (2) described above.

The processing flow then goes on to Step S227 where a ratio PCHK of the pressure slope dP1 computed at Step S217 with the negative pressure held to the pressure slope dP2 computed at Step S226 with air introduced from the atmosphere is calculated by using Equation (3) described above.

The processing flow then proceeds to Step S228 to make a judgment as to whether or not the pressure-gradient ratio PCHK computed at Step S227 exceeds a criterion value PREF used for detecting an abnormality such as fuel-gas leakage. If the judgment made at Step S228 determines that the condition is satisfied, that is, if the pressure-gradient ratio PCHK is greater than the criterion value PREF, the processing flow goes on to Step S229 where an abnormality flag is turned on (or set) to indicate that the existence of an abnormality such as fuel-gas leakage has been determined before terminating the present routine. If the judgment made at Step S228 determines that the condition is not satisfied, that is, if the pressure-gradient ratio PCHK is less than or equal to the criterion value PREF, on the other hand, the processing flow goes on to Step S230 where an abnormality flag is turned off (or cleared) to indicate that no abnormality such as fuel-gas leakage has been determined, completing the present routine.

It should be noted that the denominator and the numerator used in the calculation of the pressure-slope ratio PCHK carried out at Step S227 of the routine described above can be swapped with each other to give the reciprocal of the pressure-slope ratio PCHK. In this case, however, the criterion value PREF and the sign of inequality used at Step S228 of course need to be modified.

The abnormality detecting apparatus for use in a fuel-transpiration preventing mechanism as implemented by the present embodiment is characterized in that the canister closing valve 37 serving as an atmosphere-exposure-hole closing unit is driven by a driving signal at a canister-closing-valve duty cycle DCCV corresponding to a fuel tank internal pressure PTNK prior to the introduction of air.

As a result, the canister closing valve 37 is driven by a driving signal at a proper canister-closing-valve duty cycle DCCV corresponding to a residual fuel tank internal pressure PTNK at the subsequent atmosphere-air introducing time even if the magnitude of the resulting fuel tank internal pressure PTNK changes in dependence on the magnitude of a change in pressure occurring at the negative-pressure holding time after the introduction of a negative pressure to the fuel-transpiration preventing mechanism. Therefore, even if the negative pressure serving as the fuel tank internal pressure PTNK at the negative-pressure holding time is small in magnitude, a change in pressure at the atmosphere-air introducing time can be calculated with a high degree of precision, allowing the accuracy of the detection of an abnormality occurring in the fuel-transpiration preventing mechanism to be improved.

In each of the above-described embodiments, pressure changes dP1 and dP2 at times T1 and T2 are detected. By having times T1 and T2 be variable and detecting the pressure changes P1 and P2 in the tank, the pressure change gradient can be calculated. Also, by detecting the changing time T1 and T2 while pressure PTNK in the tank changes by a constant value, the pressure change gradient can be calculated.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An abnormality detecting apparatus for use in a fuel-transpiration preventing system, said apparatus comprising:

fuel-transpiration preventing means for absorbing fuel gas generated in a fuel tank using an absorbing material in a canister installed on a purge passage connecting said fuel tank and an intake pipe of an internal combustion engine and, by opening and closing a purge control valve in accordance with an operating state of said internal combustion engine, introducing said absorbed fuel gas into said intake pipe to thereby prevent transpiration of said fuel gas;

pressure detecting means for detecting a pressure in said fuel-transpiration preventing means;

atmosphere-exposure-hole closing means for closing an atmosphere-exposure hole bored through a wall of said canister;

first pressure-change computing means for computing a change in pressure detected by said pressure detecting means at a negative-pressure holding time after introduction of a negative pressure to said fuel-transpiration preventing means from said intake pipe according to predetermined control criteria to open and close said purge control valve and said atmosphere-exposure-hole closing means;

second pressure-change computing means for computing a change in pressure detected by said pressure detecting means at an atmosphere-air introduction time for introducing air from the atmosphere by way of said atmosphere-exposure-hole closing means following said negative-pressure holding time for holding a negative-pressure in said fuel-transpiration preventing means according to predetermined control criteria to open and close said purge control valve and said atmosphere-exposure-hole closing means; and abnormality detecting means for detecting an abnormality in said fuel-transpiration preventing means based on said changes in pressure calculated by said first and second pressure-change computing means.

2. The apparatus of claim 1, wherein said abnormality detecting means is for using pressure slopes based on said changes in pressure computed by said first and second pressure-change computing means to detect said abnormality.

3. The apparatus of claim 2, wherein said second pressure-change computing means is for computing a change in pressure at said atmosphere-air introduction time for introducing air from the atmosphere by way of said atmosphere-exposure-hole closing means after a negative pressure has been re-introduced when a large change in pressure at said negative-pressure holding time occurs in said fuel-transpiration preventing means according to predetermined control criteria to open and close said purge control valve and said atmosphere-exposure-hole closing means.

4. The apparatus of claim 3, wherein said atmosphere-exposure-hole closing means is driven by a driving signal with a duty ratio set in accordance with a negative pressure prior to introduction of air from the atmosphere.

5. The apparatus of claim 2, wherein said atmosphere-exposure-hole closing means is driven by a driving signal with a duty ratio set in accordance with a negative pressure prior to introduction of air from the atmosphere.

6. The apparatus of claim 1, wherein said second pressure-change computing means is for computing a change in pressure at said atmosphere-air introduction time for introducing air from the atmosphere by way of said atmosphere-exposure-hole closing means after a negative pressure has been re-introduced when a large change in pressure at said negative-pressure holding time occurs in said fuel-transpiration preventing means according to predetermined control criteria to open and close said purge control valve and said atmosphere-exposure-hole closing means.

7. The apparatus of claim 6, wherein said atmosphere-exposure-hole closing means is driven by a driving signal with a duty ratio set in accordance with a negative pressure prior to introduction of air from the atmosphere.

8. The apparatus of claim 1, wherein said atmosphere-exposure-hole closing means is driven by a driving signal with a-duty ratio set in accordance with a negative pressure prior to introduction of air from the atmosphere.

9. The apparatus of claim 1, wherein:

said first pressure-change computing means is for computing said change in pressure at said negative-pressure holding time, after a negative pressure is introduced to said fuel-transpiration preventing means by opening said purge control valve and closing said atmosphere-exposure-hole closing means; and said second pressure-change computing means is for computing said change in pressure at said atmosphere-air introduction time by closing said purge control valve and opening said atmosphere-exposure-hole closing means.

10. The apparatus of claim 9, wherein said second pressure-change computing means is for computing said change in pressure at said atmosphere-air introduction time, after said first pressure-change computing means has computed said change in pressure at said negative-pressure holding time, and after negative pressure has been re-introduced to said fuel-transpiration preventing means by opening said purge control valve and closing said atmosphere-exposure-hole closing means.

11. A method of detecting an abnormality in a fuel-transpiration preventing system, said method comprising the steps of:

absorbing fuel gas generated in a fuel tank using an absorbing material in a canister of a fuel-transpiration preventing mechanism installed on a purge passage connecting said fuel tank and an intake pipe of an internal combustion engine;

introducing said absorbed fuel gas into said intake pipe to thereby prevent transpiration of said fuel gas by opening and closing a purge control valve in said purge passage in accordance with an operating state of said internal combustion engine;

detecting a pressure in said fuel-transpiration preventing mechanism using a pressure sensor;

closing an atmosphere-exposure hole bored through a wall of said canister using an atmosphere-exposure-hole closing valve;

computing a first change in pressure detected by said pressure sensor at a negative-pressure holding time after introduction of a negative pressure to said fuel-transpiration preventing mechanism from said intake pipe according to predetermined control criteria to open and close said purge control valve and said atmosphere-exposure-hole closing valve;

computing a second change in pressure detected by said pressure sensor at an atmosphere-air introduction time for introducing air from the atmosphere by way of said atmosphere-exposure-hole closing valve following said negative-pressure holding time for holding a negative-pressure in said fuel-transpiration preventing mechanism according to predetermined control criteria to open and close said purge control valve and said atmosphere-exposure-hole closing valve; and detecting an abnormality in said fuel-transpiration preventing mechanism based on said changes in pressure.

12. The method of claim 11, wherein said abnormality detecting step includes a step of detecting said abnormality based on pressure slopes corresponding to said changes in pressure.

13. The method of claim 12, wherein said step of computing a second change in pressure includes a step of computing a change in pressure at said atmosphere-air introduction time for introducing air from the atmosphere by way of said atmosphere-exposure-hole closing valve after a negative pressure has been re-introduced when a large change in pressure at said negative-pressure holding time occurs in said fuel-transpiration preventing mechanism according to predetermined control criteria to open and close said purge control valve and said atmosphere-exposure-hole closing valve.

14. The method of claim 13, further comprising a step of driving said atmosphere-exposure-hole closing valve with a driving signal having a duty ratio corresponding to a negative pressure prior to introduction of air from the atmosphere.

15. The method of claim 12, further comprising a step of driving said atmosphere-exposure-hole closing valve with a driving signal having a duty ratio corresponding to a negative pressure prior to introduction of air from the atmosphere.

16. The method of claim 9, further comprising a step of driving said atmosphere-exposure-hole closing valve with a driving signal having a duty ratio corresponding to a negative pressure prior to introduction of air from the atmosphere.

17. The method of claim 11, wherein said step of computing a second change in pressure includes a step of computing a change in pressure at said atmosphere-air introduction time for introducing air from the atmosphere by way of said atmosphere-exposure-hole closing valve after a negative pressure has been re-introduced when a large change in pressure at said negative-pressure holding time occurs in said fuel-transpiration preventing mechanism according to predetermined control criteria to open and close said purge control valve and said atmosphere-exposure-hole closing valve.

18. The method of claim 17, further comprising a step of driving said atmosphere-exposure-hole closing valve with a driving signal having a duty ratio corresponding to a negative pressure prior to introduction of air from the atmosphere.

19. A transpiration prevention abnormality detecting system comprising:

a canister assembly for preventing transpiration of vapor from a tank;

a pressure sensor for generating a signal representative of internal pressure of the tank;

a positive pressure valve for selectively connecting the canister assembly to a positive pressure source;

a negative pressure valve for selectively connecting the canister assembly to a negative pressure source; and control means for holding negative pressure in the tank by selectively controlling the positive and negative pressure valves, computing a first pressure change using the pressure sensor signal while the negative pressure is held in the tank, introducing positive pressure to the tank by selectively controlling the positive and negative pressure valves, computing a second pressure change using the pressure sensor signal while the positive pressure is being introduced to the tank, and detecting the existence of an abnormality in the canister assembly based on the first and second pressure changes.

20. The system of claim 19, wherein the control means is further for, after holding negative pressure in the tank and before introducing positive pressure to the tank, re-introducing negative pressure to the tank by selectively controlling the positive and negative pressure valves.

21. The system of claim 20, wherein the control means is for re-introducing negative pressure to the tank by opening the negative pressure valve and closing the positive pressure valve.

22. The system of claim 19, wherein the control means is for holding negative pressure in the tank by opening the negative pressure valve and closing the positive pressure valve to introduce negative pressure to the tank and then closing the negative pressure valve.

23. The system of claim 19, wherein the control means is for introducing positive pressure to the tank by closing the negative pressure valve and opening the positive pressure valve.

24. The system of claim 19, wherein the control means is for detecting the existence of the abnormality based on a ratio of the first and second pressure changes.

25. A method of detecting an abnormality in a transpiration prevention system, the method comprising:

holding negative pressure in a tank;

computing a first pressure change while the negative pressure is held in the tank;

introducing positive pressure to the tank;

computing a second pressure change while the positive pressure is being introduced to the tank; and determining the existence of an abnormality in the transpiration prevention system based on the first and second pressure changes.

26. The method of claim 25, further comprising re-introducing negative pressure to the tank after holding negative pressure in the tank and before introducing positive pressure to the tank.

27. The method of claim 25, the determining being based on a ratio of said first and second pressure changes.

28. A system for detecting transpiration comprising:

a canister coupled to a tank and adapted to for prevent transpiration of vapor from the tank;

a pressure sensor that generates a signal representative of a pressure in the tank;

a canister valve open to the pressure in the tank, and having an open position that opens the canister to an external pressure source greater than a pressure in the canister, and a closed position that closes the canister to the external pressure source;

a purge valve coupled to the canister, and having an open position that opens the canister to a negative pressure source having a pressure less than the pressure in the canister, and a closed position that closes the canister to the negative pressure source; and a processor means for:

actuating the canister valve and the purge valve, and receiving the pressure sensor signal, computing a first pressure change rate in the occurring during a first period starting when the purge valve is switched from the open position to the closed position, and occurring while the canister valve is closed, computing a second pressure change rate occurring during a second period occurring after the purge valve is closed, and starting when the canister valve is switched from the closed position to an at least partially open position, and generating an abnormality signal if a ratio of the first pressure change rate to the second pressure change rate exceeds a predetermined value.

29. A method for detecting a malfunction in a transpiration prevention system having a canister coupled to a fuel tank comprising the steps of:

a. closing an external valve to the container to close the container to atmospheric pressure, b. decreasing a pressure in a fuel tank by opening a purge valve coupling the tank or canister to an intake manifold having a negative pressure, c. determining a first rate of pressure rise in the tank occurring when the purge valve is closed, and while the external valve is closed, d. determining a second rate of pressure rise in the tank occurring when the external valve is at least partially open, and e. issuing a malfunction signal if the ratio of the first rate of pressure rise to the second rate of pressure rise exceeds a threshold ratio.

* * * * *